(12) United States Patent
Takase (10) Patent No.: US 11,659,109 B2
(45) Date of Patent: May 23, 2023

(54) IMAGE SCANNER, IMAGE SCANNING SYSTEM, AND CONTROL METHOD OF IMAGE SCANNER WITH USER AUTHENTICATION AND CUSTOMIZATION OF IMAGE SCANNER SETTINGS

(71) Applicant: SEIKO EPSON CORPORATION, Tokyo (JP)

(72) Inventor: Yuji Takase, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/449,203

(22) Filed: Sep. 28, 2021

(65) Prior Publication Data
US 2022/0103706 A1 Mar. 31, 2022

(30) Foreign Application Priority Data
Sep. 30, 2020 (JP) .............................. JP2020-165272

(51) Int. Cl.
  *H04N 1/00* (2006.01)
  *H04N 1/44* (2006.01)
(52) U.S. Cl.
  CPC ..... *H04N 1/00432* (2013.01); *H04N 1/00411* (2013.01); *H04N 1/4413* (2013.01)
(58) Field of Classification Search
  None
  See application file for complete search history.

(56) References Cited

U.S. PATENT DOCUMENTS

| 10,209,934 B2* | 2/2019 | Tamura | G06F 3/1218 |
| 11,330,131 B2* | 5/2022 | Nishiyama | H04N 1/00342 |
| 2012/0099134 A1* | 4/2012 | Harigae | G03G 15/5016 358/1.13 |
| 2014/0176987 A1* | 6/2014 | Sakagami | G06F 3/1203 358/1.14 |
| 2015/0370517 A1* | 12/2015 | Tokumaru | G06F 3/1236 358/1.15 |
| 2015/0373215 A1* | 12/2015 | Hayashi | H04N 1/4426 358/1.14 |
| 2015/0381839 A1* | 12/2015 | Adachi | H04N 1/00225 358/474 |
| 2017/0187912 A1* | 6/2017 | Tamura | H04N 1/00339 |
| 2021/0306490 A1* | 9/2021 | Mizuno | H04N 1/4433 |

FOREIGN PATENT DOCUMENTS

JP 2006-163044 A 6/2006

* cited by examiner

*Primary Examiner* — Henok Shiferaw
(74) *Attorney, Agent, or Firm* — Workman Nydegger (57) ABSTRACT

An image scanner includes a display unit configured to display a UI screen, an authentication unit configured to authenticate a user based on an identification information of the user, a display control unit configured to control display, a setting unit configured to set functions of the image scanner according to setting information selected on the UI screen in a state in which the user is successfully authenticated, and a storage unit configured to store a database in which the identification information, at least one of the functions, and the setting information are registered in association with each other, in which the display control unit acquires the setting information from the database corresponding to the identification information and the functions displayed to the UI screen when the identification medium is read corresponds, and causes the display unit to display the acquired setting information.

8 Claims, 9 Drawing Sheets

| USER ID | FUNCTION | DESTINATION | SCANNING METHOD | ADMINISTRATOR INFORMATION |
|---|---|---|---|---|
| 001XXXX | Scan to folder | Temp¥xx¥xx | COLOR, PDF, 200 dpi, NO ROTATION... | NORMAL USER |
| 001XXXX | Scan to folder | Temp3¥yy¥yy | COLOR, JPEG, 600 dpi, NO ROTATION... | NORMAL USER |
| 001XXXX | Scan to mail | Ep.Taro@xx.xx | MONOCHROME, PDF, 300 dpi, 90 DEGREES ROTATION... | NORMAL USER |
| 002XXXX | Scan to folder | Temp2¥zz¥zz | MONOCHROME, PDF, 300 dpi, 90 DEGREES ROTATION... | ADMINISTRATOR |
| 003XXXX | Scan to mail | Ab.Jiro@yy.y | MONOCHROME, PDF, 300 dpi, 90 DEGREES ROTATION... | NORMAL USER |

IMAGE SCANNER, IMAGE SCANNING SYSTEM, AND CONTROL METHOD OF IMAGE SCANNER WITH USER AUTHENTICATION AND CUSTOMIZATION OF IMAGE SCANNER SETTINGS

The present application is based on, and claims priority from JP Application Serial Number 2020-165272, filed Sep. 30, 2020, the disclosure of which is hereby incorporated by reference herein in its entirety.

BACKGROUND

1. Technical Field

The present disclosure relates to an image scanner, an image scanning system, and a control method of the image scanner.

2. Related Art

An image output apparatus provided with an individual authentication means for performing individual authentication using a contactless ID card that stores an individual information identifier and a contactless ID card reader that reads the individual information identifier from the contactless ID card is known (see JP-A-2006-163044).

Hitherto, a card that stores identification information of a user has been used for individual authentication of the user, and when the individual authentication is successful, the use of a device such as a scanner has been permitted.

However, it is desired to enhance the convenience of the user by using the identification information for purposes other than the individual authentication.

SUMMARY

An image scanner includes a display unit configured to display a user interface (hereinafter, referred to as UI) screen configured to receive operation, an authentication unit configured to authenticate a user based on identification information input through reading of an identification medium having the identification information of the user, a display control unit configured to control display by the display unit, a setting unit configured to set functions of the image scanner according to setting information selected on the UI screen in a state in which the user is successfully authenticated by the authentication unit, and a storage unit configured to store a database in which the identification information, at least one of the functions, and the setting information are registered in association with each other, in which the display control unit acquires the setting information from the database according to the identification information input through reading of the identification medium and the functions to which the UI screen displayed by the display unit when the identification medium is read corresponds, and causes the display unit to display the acquired setting information.

An image scanning system including an image scanner and a storage apparatus that are communicably connected with each other, in which the image scanner includes a display unit configured to display a UI screen configured to receive operation, an authentication unit configured to authenticate a user based on identification information input through reading of an identification medium having the identification information of the user, a display control unit configured to control display by the display unit, and a setting unit configured to set functions of the image scanner according to setting information selected on the UI screen in a state in which the user is successfully authenticated by the authentication unit, and the storage apparatus stores a database in which the identification information, at least one of the functions, and the setting information are registered in association with each other, and the display control unit acquires the setting information from the database according to the identification information input through reading of the identification medium and the functions to which the UI screen displayed by the display unit when the identification medium is read corresponds, and causes the display unit to display the acquired setting information.

A control method of an image scanner includes a display control step for causing a display unit to display a UI screen configured to receive operation, an authentication step for authenticating a user based on identification information input through reading of an identification medium having the identification information of the user, and a setting step for setting one of functions of the image scanner according to setting information selected on the UI screen in a state in which the user is successfully authenticated in the authentication step, in which in the display control step, a database in which the identification information, at least one of the functions, and the setting information are registered in association with each other is referred, the setting information corresponding to the identification information input through reading of the identification medium and the functions to which the UI screen displayed by the display unit when the identification medium is read corresponds is acquired, and the acquired setting information is displayed by the display unit.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

1. Outline of Apparatus Configuration

Figure 1:
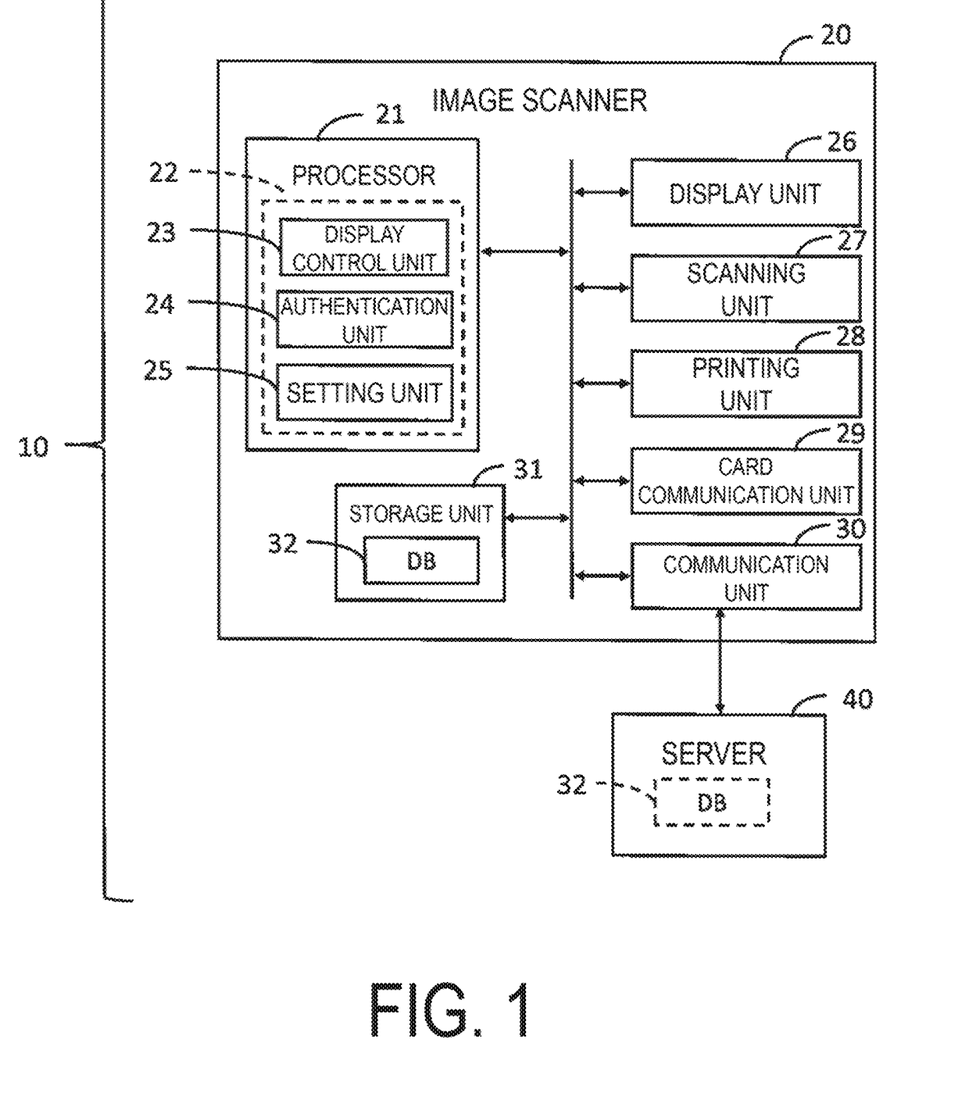
FIG. 1 is a block diagram illustrating a system in a simple manner.

FIG. 1 illustrates a configuration of a system 10 according to the present embodiment by a block diagram in a simple manner. The system 10 includes an image scanner 20 and a server 40 communicatively connected to each other. The system 10 may be referred to as an image scanning system, a display control system, or the like. The server 40 is an example of an external storage apparatus as seen from the image scanner 20.

The image scanner 20 includes a processor 21 including a CPU and the like. The processor 21 functions as a display control unit 23, an authentication unit 24, a setting unit 25, and the like according to a program 22 and data stored in a predetermined memory. The processor 21 executes a control method of the image scanner 20. The image scanner 20 includes a display unit 26, a scanning unit 27, a printing unit 28, a card communication unit 29, a communication unit 30, a storage unit 31, and the like.

The display unit 26 displays a UI screen that receives operation by a user under control of the display control unit 23. The display unit 26 may be a touch panel display capable of touch input by a user, or may be a display in which touch input is not possible. When the display unit 26 is a display in which touch input is not possible, the display unit 26 receives input or selection for the UI screen by operating physical buttons or the like (not illustrated) outside the display unit 26.

The scanning unit 27 is a mechanism for scanning an original document and generating image data. As is known, the scanning unit 27 includes a light source, various optical systems, an image sensor, an image processing circuit, and the like. The printing unit 28 is a mechanism for executing printing on a printing medium based on the image data. The printing unit 28 executes printing by, for example, an ink jet system or an electrographic system. Of course, the printing unit 28 is capable of executing printing based on the image data generated by the scanning unit 27, that is, copying the original document. The image scanner 20 including the scanning unit 27 can be referred to as a scanner. Further, the image scanner 20 including the scanning unit 27 and the printing unit 28 can be referred to as a multi-function printer or a copying machine. However, the image scanner 20 may be a product that does not include the printing unit 28.

The communication unit 30 is a general term for one or more interfaces for the image scanner 20 to perform communication with an external device by wire or wirelessly according to a predetermined communication protocol. In the example of FIG. 1, the communication unit 30 is communicably connected to the server 40. Of course, the communication unit 30 can also communicate with a personal computer (PC), a smartphone, or the like (not illustrated).

The storage unit 31 constituted of a memory or a storage apparatus included in the image scanner 20 stores a database 32. The database is abbreviated as DB. DB may be paraphrased as a table. The DB 32 will be described later with reference to FIG. 2. The DB 32 may be stored in a storage apparatus outside the image scanner 20. That is, as illustrated in FIG. 1, the DB 32 may be stored in the server 40 and image scanner 20 may access the DB 32 stored in the server 40 as needed. When the image scanner 20 is configured to store the DB 32, the server 40 may be omitted. In the following, the description will be continued without distinguishing whether the DB 32 is stored in the image scanner 20 or stored outside the image scanner 20.

The card communication unit 29 is a reader that reads an identification medium having identification information of a user. The card communication unit 29 may be a unit included in the image scanner 20 or may be a peripheral device communicatively connected to the image scanner 20. For each user who uses the image scanner 20, an identification medium in which unique identification information is written for each user is provided in advance. Here, an IC card is assumed as an example of the identification medium. In the following, the identification information of the user will be referred to as user ID. Since the user ID is also information unique to each IC card, the user ID may be regarded as a card ID or a card number.

The card communication unit 29 is a reader that is compatible with contactless near field communication, and reads the user ID from the IC card that the user brings close to the card communication unit 29. The standard for near field communication is not limited here. Alternatively, the card communication unit 29 may have an IC card insertion slot and may be configured to read a user ID from an IC card inserted into the insertion slot. Further, it is referred to as the "card" communication unit 29 here, the reader corresponding to the card communication unit 29 may be configured to read identification information of a user from not only a card-type identification medium, but also a stick-type or memory-type identification medium, or a smart phone or the like compatible with near field communication.

2. Description of DB

Figure 2:
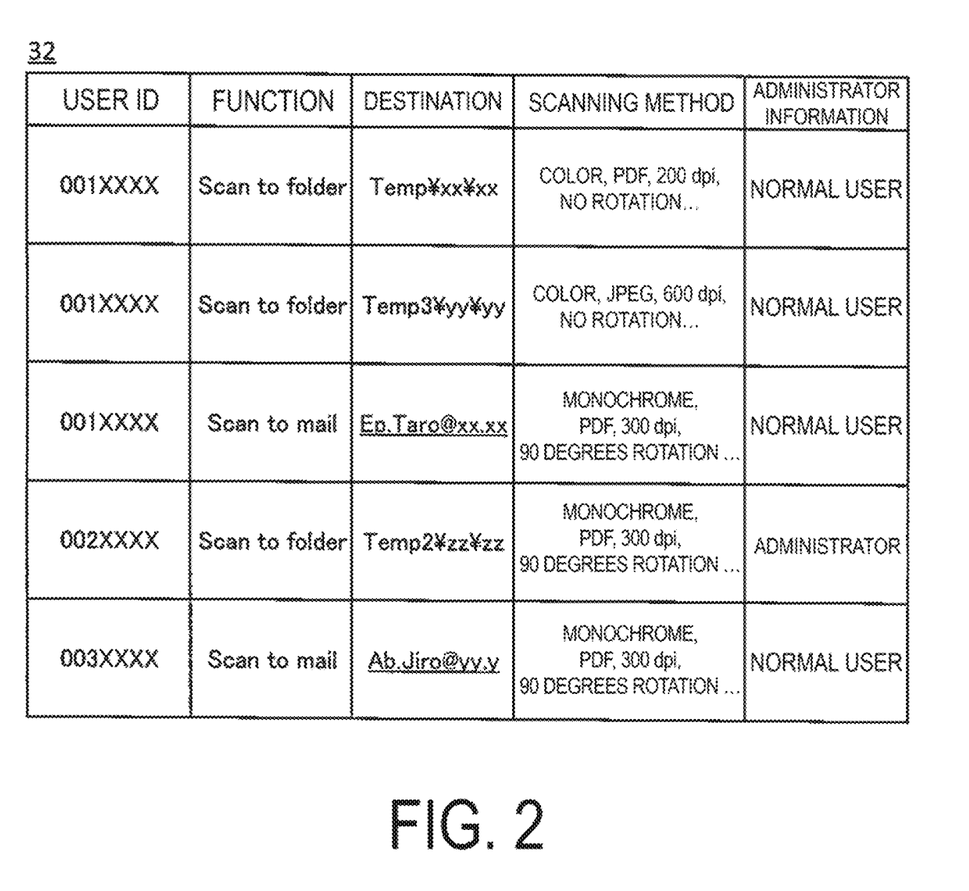
FIG. 2 is a diagram illustrating a DB.

FIG. 2 illustrates a specific example of the DB 32. A plurality of user IDs are registered in the DB 32. In addition, for each of the user IDs, the function of the image scanner 20, the destination, the scanning method, and the administrator information are registered in association with each other. The image scanner 20 has various functions, and the functions include a scan to folder function and a scan to mail function. The scan to folder function is a function of transmitting image data generated by scanning an original document by a selected scanning method to a selected folder and saving the image data. The scan to mail function is a function of transmitting image data generated by scanning an original document by a selected scanning method to a selected email address. The scan to folder function and the scan to mail function are also collectively referred to as a scan transmission function.

The destination and the scanning method in the DB 32 are collectively referred to as also "setting information" for setting a certain function of the image scanner 20. The destination is a path indicating a location of a folder to be sent by the scan to folder function, or an e-mail address to be sent by the scan to mail function. The destination for the scan to folder function is, for example, a folder in a drive of the server 40 or a PC (not illustrated). The scanning method is a setting of how the scanning unit 27 should scan the original document to generate image data. For example, color scan/monochrome scan, file format of image data, scanning resolution, rotation/non-rotation, and the like are designated.

The administrator information in the DB 32 is information indicating the presence or absence of the administrative authority for the image scanner 20, and in the example of FIG. 2, it is either a normal user or an administrator. The administrator means a user who has administrative authority, and the normal user means a user who does not have the administrative authority. According to the DB 32, for example, for the user ID "002XXXX", a set of the destination and the scanning method are registered as setting information for the scan to folder function, and the "administrator" is registered as the administrator information. In addition, for the user ID "001XXXX", two sets of the destinations and the scanning methods are registered as the setting information for the scan to folder function, and one set of the destination and the scanning method is registered as the setting information of the scan to mail function, and the "normal user" is registered as the administrator information.

Such registration of information in the DB 32 is executed, for example, by the administrator directly operating the image scanner 20 or the server 40 with the consent of each user. In addition, the administrator may operate a smartphone or a PC to edit the registered contents of the DB 32 held by the image scanner 20 or the server 40 from the outside through a dedicated application or browser. Note that, for all of the plurality of user IDs registered in the DB 32, the function of the image scanner 20, the setting information, and the administrator information are not always registered in association with each other.

The image scanner 20 may have various functions such as a copy function and a facsimile transmission function in addition to the scan to folder function and the scan to mail function. Accordingly, in association with a certain user ID, the setting information for the copy function, the setting information for the facsimile transmission function, and the like may be registered in the DB 32. The setting information for the copy function is, for example, information for designating color printing/monochrome printing, printing resolution, paper size, number of copies, double-sided copying/single-sided copying, rotation/non-rotation, and the like. The setting information for the facsimile transmission function is, for example, information for designating a facsimile number as a destination and a scanning method.

3. Display Control Processing of UI Screen

Next, the display control processing of the UI screen and the like will be described on the premise that the DB 32 is stored in the storage unit 31 or the server 40.

Figure 3:
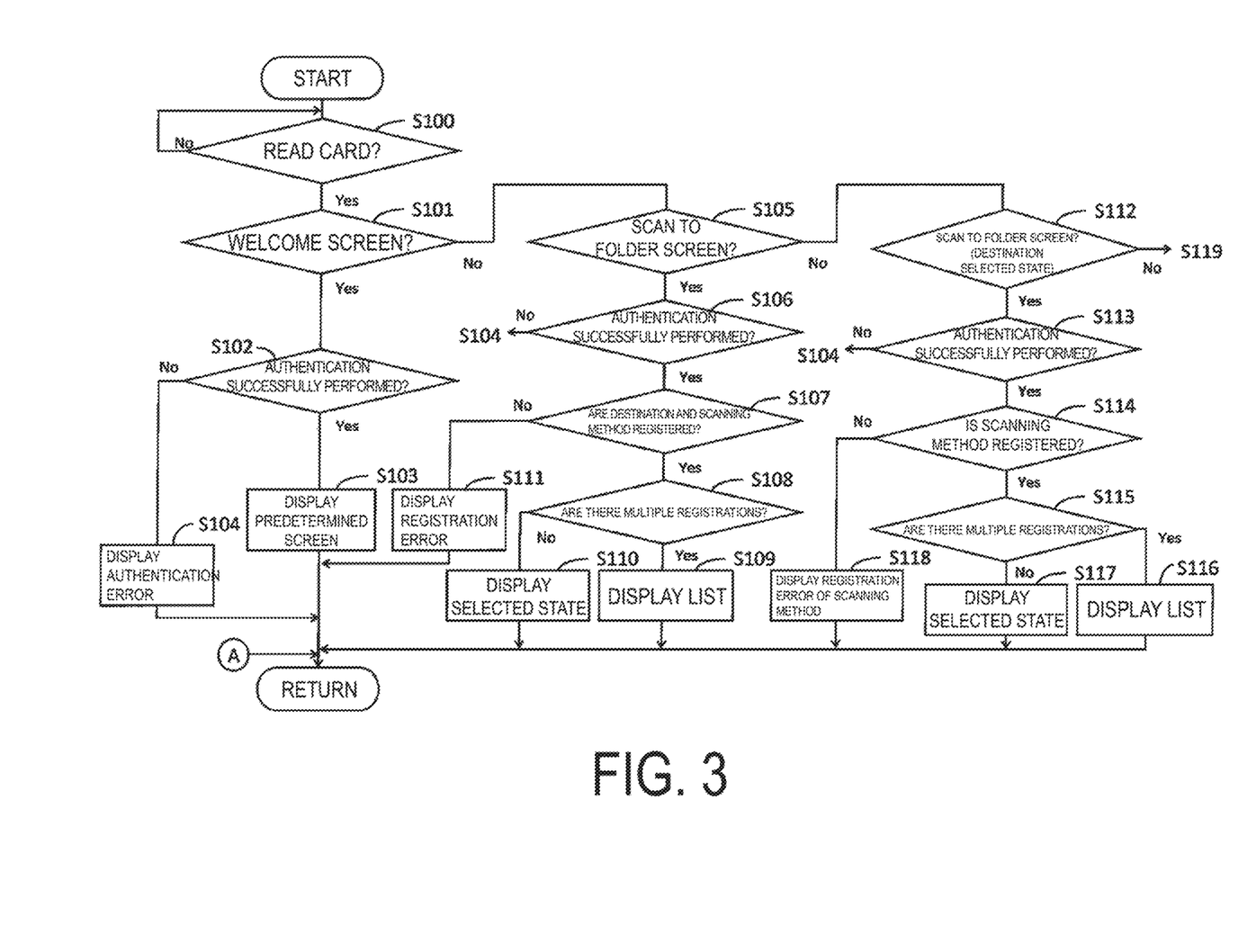
FIG. 3 is a flowchart illustrating the present embodiment.
Figure 4:
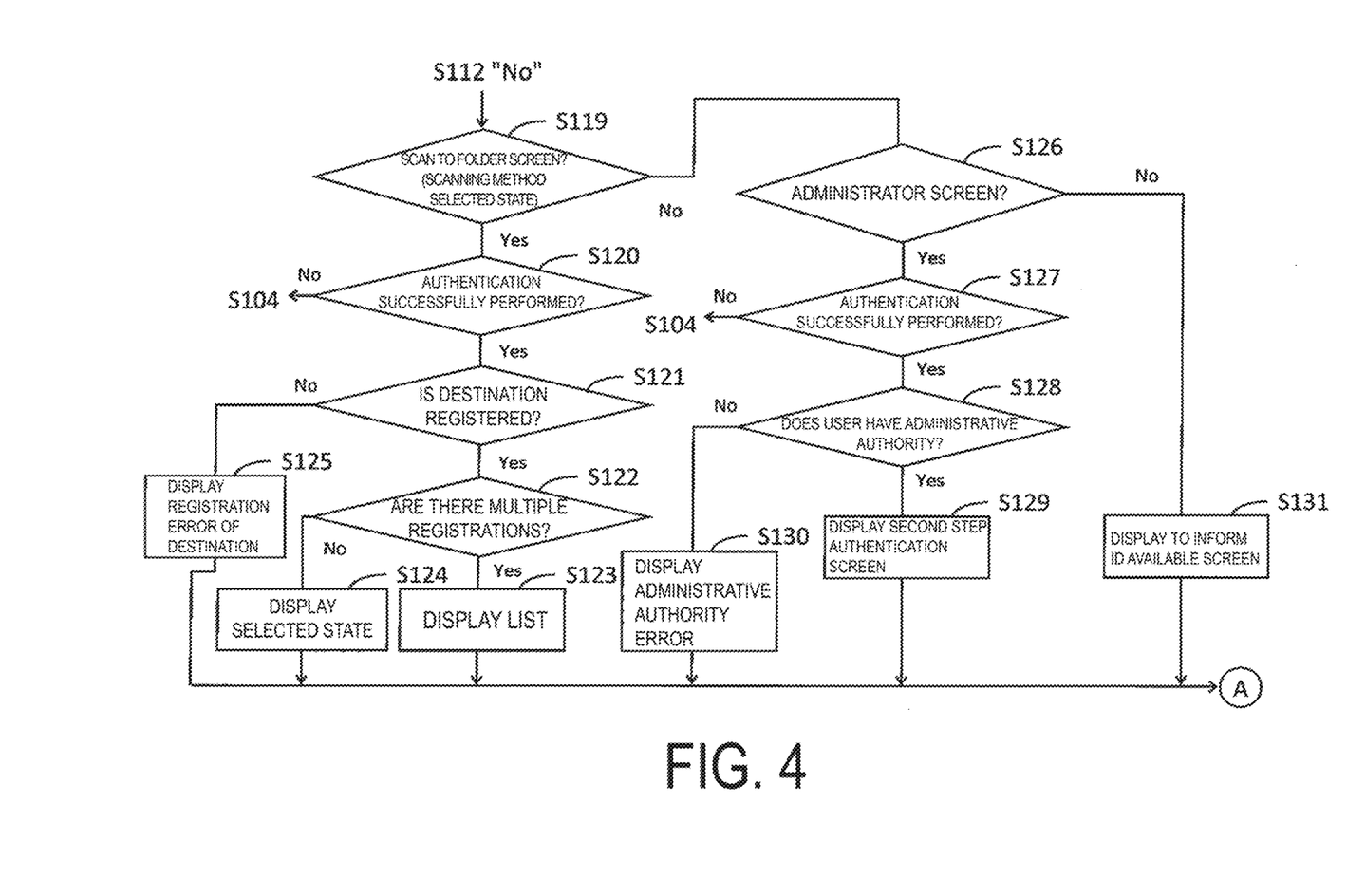
FIG. 4 is a flowchart illustrating the present embodiment in combination with FIG. 3.

FIGS. 3 and 4 are flow charts mainly illustrating authentication processing and display control processing, which are pieces of control processing to be executed by the processor 21 according to the program 22.

As illustrated in FIG. 3, the display control unit 23 continuously determines whether the IC card has been read by the card communication unit 29 (step S100). When the user brings his/her own IC card close to the card communication unit 29 or inserts the IC card into the card communication unit 29, the card communication unit 29 reads the IC card, and the display control unit 23 detects that the IC card has been read by the card communication unit 29.

When the display control unit 23 detects that the IC card has been read by the card communication unit 29, the display control unit 23 determines "Yes" in step S100 and the processing proceeds to step S101.

In step S101, the display control unit 23 determines whether a UI screen that the display control unit 23 causes the display unit 26 to display at present is a "welcome screen". When the UI screen is the "welcome screen", the display control unit 23 determines "Yes" and the processing proceeds to step S102, and when the UI screen is other than the "welcome screen", the display control unit 23 determines "No" and the processing proceeds to step S105.

Figure 5A:
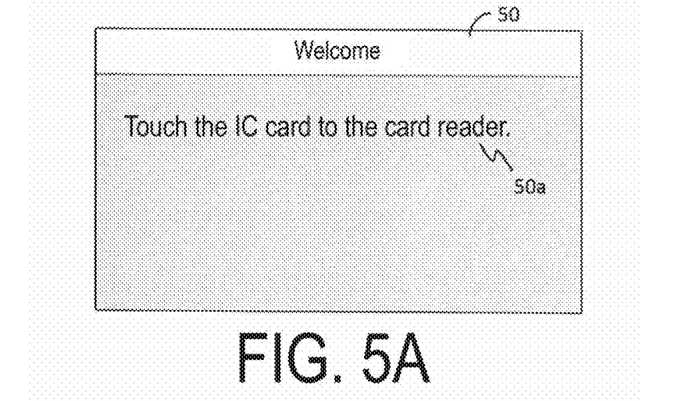
FIG. 5A is a diagram illustrating a UI screen as a welcome screen.

FIG. 5A illustrates an example of a UI screen 50 as the "welcome screen". The UI screen 50 is a UI screen that is often seen when a user tries to use the image scanner 20 while the image scanner 20 is powered on. On the UI screen 50, a message 50*a* prompting the user to have the card communication unit 29 read the IC card is displayed. Accordingly, the user can visually recognize the message 50*a* and have the card communication unit 29 read the IC card.

In step S102, the authentication unit 24 inputs the user ID acquired by the card communication unit 29 reading the IC card, and authenticates the user based on this user ID. Hereinafter, the user ID acquired by the card communication unit 29 reading the IC card will be referred to as an "input user ID". When the authentication of the user is successful, the processing proceeds to step S103 based on the determination of "Yes" by the authentication unit 24. On the other hand, when the authentication of the user fails, the processing proceeds to step S104 based on the determination of "No".

The authentication unit 24 refers to the DB 32, and determines that the authentication is successful when the input user ID and a user ID registered in the DB 32 match. On the other hand, the authentication unit 24 refers to the DB 32, and determines that the authentication fails when the input user ID and the user ID registered in the DB 32 do not match.

In step S103, the display control unit 23 causes the display unit 26 to display a predetermined UI screen to be displayed next to the welcome screen, and then the flowcharts of FIGS. 3 and 4 are terminated. For example, a home screen or the like that displays a list of various functions of the image scanner 20 as options corresponds to the predetermined UI screen. Needless to say, the flowcharts of FIGS. 3 and 4 illustrate only some of the pieces of processing executed by the image scanner 20. Accordingly, "the flowcharts of FIGS. 3 and 4 are terminated" means that the processor 21 proceeds the necessary processing in accordance with any operation performed by the user on the UI screen displayed by the display unit 26 at that time. Further, once terminating the flowcharts of FIGS. 3 and 4, the processor 21 may return to the determination in step S100 again.

In step S104, the display control unit 23 causes the display unit 26 to display a UI screen indicating an authentication error, and then the flowcharts of FIGS. 3 and 4 are terminated.

Figure 5B:
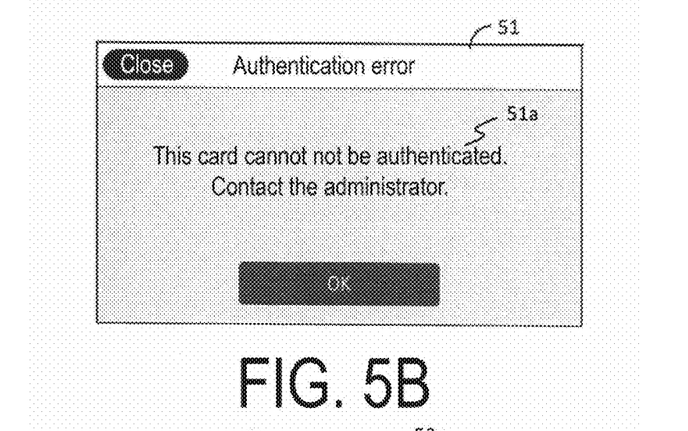
FIG. 5B is a diagram illustrating a UI screen for displaying an authentication error.

FIG. 5B illustrates an example of a UI screen 51 indicating the authentication error. In the UI screen 51, a message 51*a* is displayed to notify the user that the user authentication by the IC card has failed and that the administrator should be contacted.

In step S105, the display control unit 23 determines whether a UI screen that the display control unit 23 causes the display unit 26 to display at present is a "scan to folder screen". In other words, even at the timing when a UI screen other than the "welcome screen" as illustrated in FIG. 5A is displayed by the display unit 26, the user can input the user ID into the image scanner 20 by having the card communication unit 29 read the IC card.

The "scan to folder screen" is a UI screen that allows the user to select setting information in order to set the scan to folder function, which is one of the functions of the image scanner 20, and is a UI screen in which the destination and the scanning method are not selected. When the UI screen that the display control unit 23 causes the display unit 26 to display at present is the "scan to folder screen", the display control unit 23 determines "Yes" and the processing proceeds to step S106. When the UI screen is not the "scan to folder screen", the display control unit 23 determines "No" and the processing proceeds to step S112.

Figure 5C:
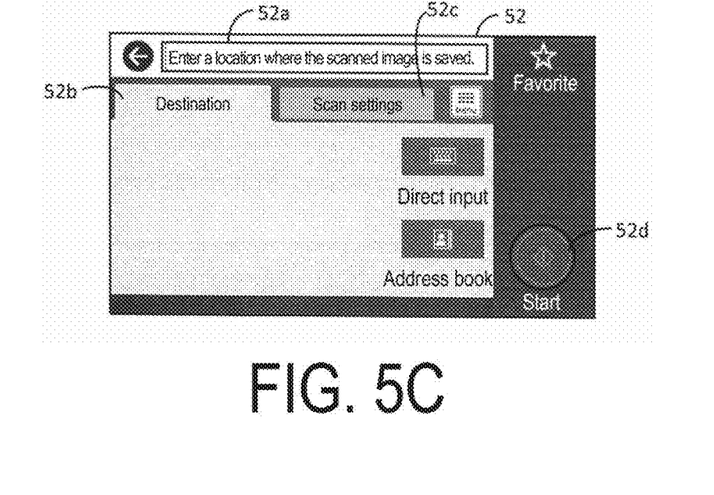
FIG. 5C is a diagram illustrating a UI screen as a scan to folder screen.

FIG. 5C illustrates an example of a UI screen 52 as the "scan to folder screen". The UI screen 52 has a destination input field 52a, a destination tab 52b, a scan setting tab 52c, a start button 52d, and the like. With the destination tab 52b selected, the user can display the destination in the destination input field 52a by freely inputting or selecting a destination. In the example of FIG. 5C, of course, the destination is not displayed in the destination input field 52a. In addition, the user can freely select the scanning method with the scan setting tab 52c selected. In FIG. 5C, the scan setting means the scanning method. In the example of FIG. 5C, the scan setting tab 52c is not selected, but the destination tab 52b is selected. The start button 52d is a button for confirming the selection of the setting information at present and starting the execution of the function of the image scanner 20. However, in the state of the UI screen 52, since the setting information such as the destination is not selected, the start button 52d is disabled and cannot be operated. Such a UI screen 52 is an example of a "first UI screen" corresponding to the scan transmission function of the image scanner 20.

In step S106, the authentication unit 24 authenticates the user in the same manner as in step S102. When the authentication of the user is successful, the processing proceeds to step S107 based on the determination of "Yes" in step 106 by the authentication unit 24. On the other hand, when the authentication of the user fails, the processing proceeds to step S104 based on the determination of "No" in step S106.

In step S107, the display control unit 23 refers to the DB 32 and determines whether the destination and scanning method are registered in the DB 32 corresponding to the input user ID and the scan to folder function. When the destination and the scanning method are registered in the DB 32 corresponding to the input user ID and the scan to folder function, the processing proceeds to step S108 based on the determination of "Yes" by the display control unit 23. When the destination and the scanning method are not registered in the DB 32, the processing proceeds to step S111 based on the determination of "No".

In step S108, the display control unit 23 determines whether there are a plurality of destinations and the scanning methods registered in the DB 32 corresponding to the input user ID and the scan to folder function. When there are the plurality of destinations and scanning methods, the processing proceeds to step S109 based on the determination of "Yes". When there is one destination and one scanning method, the processing proceeds to step S110 based on the determination of "No".

For example, it is assumed that the input user ID is "002XXXX". According to the DB 32 in FIG. 2, since only one set of the destination and the scanning method corresponding to the input user ID "002XXXX" and the scan to folder function is registered, the display control unit 23 determines "No" in step S108.

Further, for example, it is assumed that the input user ID is "001XXXX". According to the DB 32 in FIG. 2, since two sets of the destinations and the scanning methods corresponding to the input user ID "001XXXX" and the scan to folder function are registered, the display control unit 23 determines "Yes" in step S108.

In step S109, the display control unit 23 acquires a plurality of the destinations and the scanning methods that are registered in the DB 32 corresponding to the input user ID and the scan to folder function from the DB 32, and causes the display unit 26 to display a list thereof. Then, the flowcharts of FIGS. 3 and 4 are terminated.

Figure 6A:
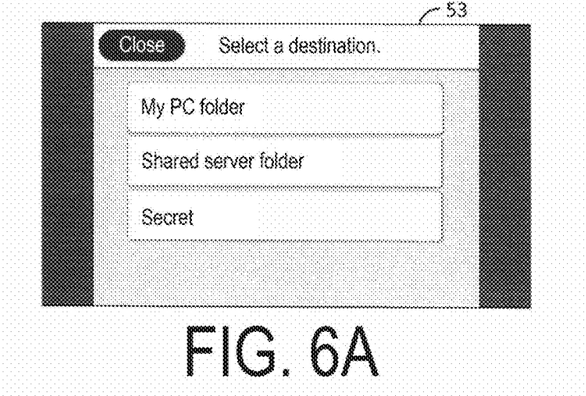
FIG. 6A is a diagram illustrating a UI screen for displaying a list of destinations.

FIG. 6A illustrates an example of a UI screen 53 that the display control unit 23 causes the display unit 26 to display in step S109. On the UI screen 53, a list of the plurality of destinations registered in the DB 32 corresponding to the input user ID and the scan to folder function is displayed. The example of FIG. 6A is the list of destinations. However, in step S109, a list of the plurality of scanning methods registered in the DB 32 corresponding to the input user ID and the scan to folder function is also displayed on the UI screen 53 as illustrated in FIG. 7B described later. In step S109, the display control unit 23 may switch between such a list display of the destinations and a list display of the scanning methods according to the user operation. Thus, the user can select a desired destination from the plurality of destinations presented on the UI screen 53. Similarly, the user can select a desired scanning method from the plurality of scanning methods presented on the UI screen 53.

In step S110, the display control unit 23 acquires one destination and one scanning method registered in the DB 32 corresponding to the input user ID and the scan to folder function from the DB 32, and causes the display unit 26 to display the acquired destination and scanning method. Then, the flowcharts of FIGS. 3 and 4 are terminated.

Figure 6B:
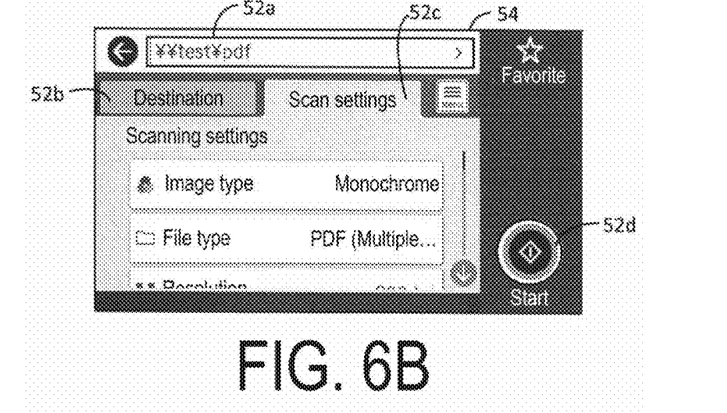
FIG. 6B is a diagram illustrating a UI screen in a state in which a destination and a scanning method are selected.

FIG. 6B illustrates an example of a UI screen 54 that the display control unit 23 causes the display unit 26 to display in step S110. Similar to the UI screen 52, the UI screen 54 has the destination input field 52a, the destination tab 52b, the scan setting tab 52c, the start button 52d, and the like. The UI screen 54 is different from the UI screen 52 in that one destination is displayed in the destination input field 52a. That is, the destination displayed in the destination input field 52a on the UI screen 54 is a destination acquired from the DB 32 by the display control unit 23 as the setting information corresponding to the input user ID and the scan to folder function. Further, the UI screen 54 is also different from the UI screen 52 in that the scan setting tab 52c is selected, and one scanning method such as monochrome, PDF, and the like is displayed in the field corresponding to the scan setting tab 52c. That is, the scanning method displayed in the field corresponding to the scan setting tab 52c on the UI screen 54 is a scanning method acquired from the DB 32 by the display control unit 23 as setting information corresponding to the input user ID and the scan to folder function.

It can be said that such a UI screen 54 displays a state in which one destination and one scanning method for the scan to folder function are selected. Accordingly, on the UI screen 54, the start button 52d is enabled, and the user may press the start button 52d when there is no problem in selecting the destination and the scanning method at present.

In step S111, the display control unit 23 causes the display unit 26 to display a UI screen indicating that a registration error of the setting information such as the destination and the scanning method, and then the flowcharts of FIGS. 3 and 4 are terminated.

Figure 6C:
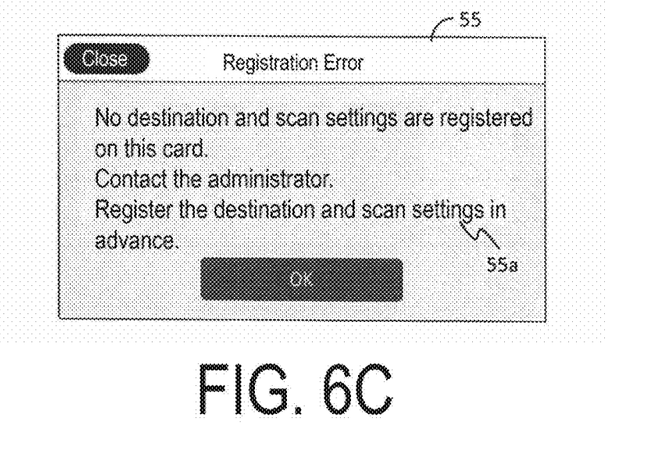
FIG. 6C is a diagram illustrating a UI screen for displaying a registration error.

FIG. 6C illustrates an example of a UI screen 55 indicating that the registration error of the setting information has occurred. On the UI screen 55, a message 55a is displayed to notify the user that the setting information corresponding to the user ID of the read IC card is not registered and that the setting information should be registered by contacting the administrator.

In step S112, the display control unit 23 determines whether a UI screen that the display control unit 23 causes the display unit 26 to display at present is a "scan to folder screen in the destination selected state". The "scan to folder screen in the destination selected state" is a UI screen that allows the user to select the setting information in order to set the scan to folder function, and is a UI screen in which the destination is selected and the scanning method is not selected. When the UI screen that the display control unit 23 causes the display unit 26 to display at present is the "scan to folder screen in the destination selected state", the display control unit 23 determines "Yes" and the processing proceeds to step S113. When the UI screen is not the "scan to folder screen in the destination selected state", the display control unit 23 determines "No" and the processing proceeds to step S119. See FIG. 4 for step S119 and subsequent steps.

Figure 7A:
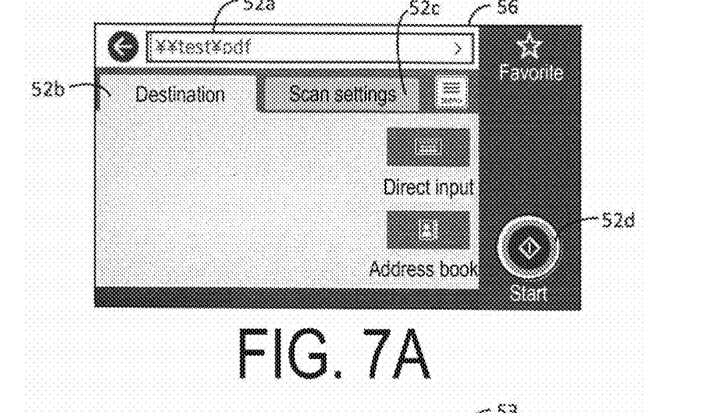
FIG. 7A is a diagram illustrating a UI screen in a destination selected state.
Figure 7B:
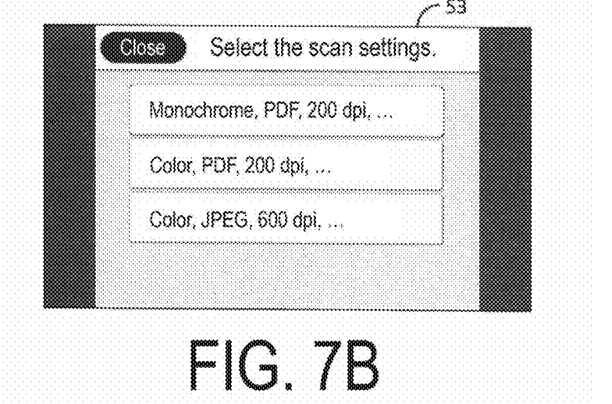
FIG. 7B is a diagram illustrating a UI screen for displaying a list of scanning methods.

FIG. 7A illustrates an example of a UI screen 56 as the "scan to folder screen in the destination selected state". Similar to the UI screens 52 and 54, the UI screen 56 has the destination input field 52a, the destination tab 52b, the scan setting tab 52c, the start button 52d, and the like. On the UI screen 56, since the destination is displayed in the destination input field 52a, the destination is selected, but since the content of the field corresponding to the scan setting tab 52c is unknown, it can be said that the scanning method is not selected. Such a UI screen 56 is a screen for selecting a scanning method and is a kind of the first UI screen corresponding to the scan transmission function, and corresponds to a "second UI screen" in which the destination is selected.

In step S113, the authentication unit 24 authenticates the user in the same manner as in steps S102 and S106. When the authentication of the user is successful, the processing proceeds to step S114 based on the determination of "Yes" in step S113 by the authentication unit 24. When the authentication of the user fails, the processing proceeds to step S104 based on the determination of "No" in step S113.

In step S114, the display control unit 23 refers to the DB 32 and determines whether the scanning method is registered in the DB 32 corresponding to the input user ID and the scan to folder function. When the scanning method corresponding to the input user ID and the scan to folder function is registered in the DB 32, the processing proceeds to step S115 based on the determination of "Yes" by the display control unit 23. When the scanning method is not registered, the processing proceeds to step S118 based on the determination of "No".

In step S115, the display control unit 23 determines whether there are a plurality of scanning methods registered in the DB 32 corresponding to the input user ID and the scan to folder function. When there are the plurality of scanning methods, the processing proceeds to step S116 based on the determination of "Yes". When there is one scanning method, the processing proceeds to step S117 based on the determination of "No".

In step S116, the display control unit 23 acquires the plurality of scanning methods registered corresponding to the input user ID and the scan to folder function from the DB 32, and causes the display unit 26 to display a list thereof. Then, the flowcharts of FIGS. 3 and 4 are terminated.

FIG. 7B illustrates an example of the UI screen 53 that the display control unit 23 causes the display unit 26 to display in step S116. On the UI screen 53 of FIG. 7B, a list of the plurality of scanning methods registered in the DB 32 corresponding to the input user ID and the scan to folder function is displayed.

In step S117, the display control unit 23 acquires one scanning method registered corresponding to the input user ID and the scan to folder function from the DB 32 and causes the display unit 26 to display the acquired scanning method. Then, the flowcharts of FIGS. 3 and 4 are terminated. In step S117, since the destination has already been selected, as a result, the UI screen 54 as illustrated in FIG. 6B is displayed as in step S110.

In step S118, the display control unit 23 causes the display unit 26 to display a UI screen indicating a registration error of the scanning method, and then the flowcharts of FIGS. 3 and 4 are terminated.

Figure 7C:
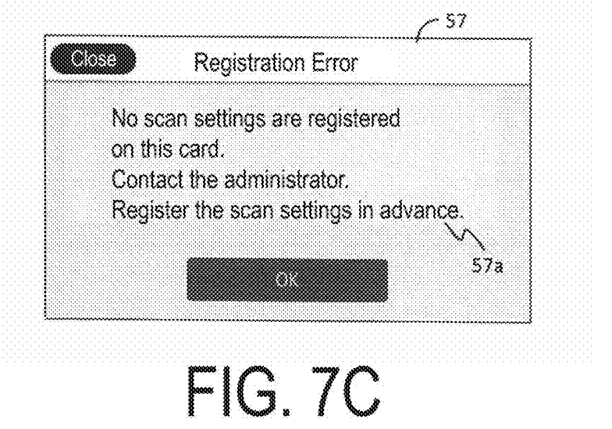
FIG. 7C is a diagram illustrating a UI screen for displaying a registration error.

FIG. 7C illustrates an example of a UI screen 57 indicating the registration error of the scanning method. On the UI screen 57, a message 57a is displayed to notify the user that the scanning method corresponding to the user ID of the read IC card is not registered and that the scanning method should be registered by contacting the administrator.

As illustrated in FIG. 4, in step S119, the display control unit 23 determines whether a UI screen that the display control unit 23 causes the display unit 26 to display at present is the "scan to folder screen in the scanning method selected state". The "scan to folder screen in the scanning method selected state" is a UI screen that allows the user to select setting information in order to set the scan to folder function, and is a UI screen in which the scanning method is selected and the destination is not selected. When the UI screen that the display control unit 23 causes the display unit 26 to display at present is the "scan to folder screen in the scanning method selected state", the display control unit 23 determines "Yes" and the processing proceeds to step S120. When the UI screen is not the "scan to folder screen in the scanning method selected state", the display control unit 23 determines "No" and the processing proceeds to step S126.

Figure 8A:
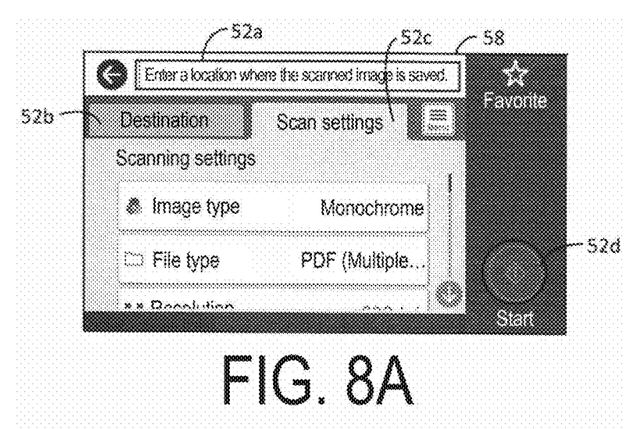
FIG. 8A is a diagram illustrating a UI screen in a scanning method selected state.

FIG. 8A illustrates an example of a UI screen 58 as the "scan to folder screen in the scanning method selected state". Similar to the UI screens 52, 54, and 56, the UI screen 58 has the destination input field 52a, the destination tab 52b, the scan setting tab 52c, the start button 52d, and the like. On the UI screen 58, since the scanning method is displayed in the field corresponding to the scan setting tab 52c, the scanning method is selected. However, since the destination is not displayed in the destination input field 52a, it can be said that the destination is not selected. Such a UI screen 58 is a screen for selecting a destination and is a kind of the first UI screen corresponding to the scan transmission function, and corresponds to a "third UI screen" in which the scanning method is selected.

In step S120, the authentication unit 24 authenticates the user in the same manner as in steps S102, S106, and S113. When the authentication of the user is successful, the processing proceeds to step S121 based on the determination of "Yes" in step S120 by the authentication unit 24. When the authentication of the user fails, the processing proceeds to step S104 based on the determination of "No" in step S120.

In step S121, the display control unit 23 refers to the DB 32 and determines whether the destination is registered in the DB 32 corresponding to the input user ID and the scan to folder function. When the destination corresponding to the input user ID and the scan to folder function is registered in the DB 32, the processing proceeds to step S122 based on the determination of "Yes" by the display control unit 23. When the destination is not registered, the processing proceeds to step S125 based on the determination of "No".

In step S122, the display control unit 23 determines whether there are a plurality of destinations registered in the DB 32 corresponding to the input user ID and the scan to folder function. When there are the plurality of destinations, the processing proceeds to step S123 based on the determination of "Yes". When there is one destination, the processing proceeds to step S124 based on the determination of "No".

In step S123, the display control unit 23 acquires the plurality of destinations registered corresponding to the input user ID and the scan to folder function from the DB 32, and causes the display unit 26 to display a list thereof. Then, the flowcharts of FIGS. 3 and 4 are terminated. That is, in step S123, the UI screen 53 as illustrated in FIG. 6A is displayed.

In step S124, the display control unit 23 acquires one destination registered corresponding to the input user ID and the scan to folder function from the DB 32 and causes the display unit 26 to display the acquired destination. Then, the flowcharts of FIGS. 3 and 4 are terminated. In step S124, since the scanning method has already been selected, as a result, the UI screen 54 as illustrated in FIG. 6B is displayed as in steps S110 and S117.

In step S125, the display control unit 23 causes the display unit 26 to display a UI screen indicating a registration error of the destination, and then the flowcharts of FIGS. 3 and 4 are terminated.

Figure 8B:
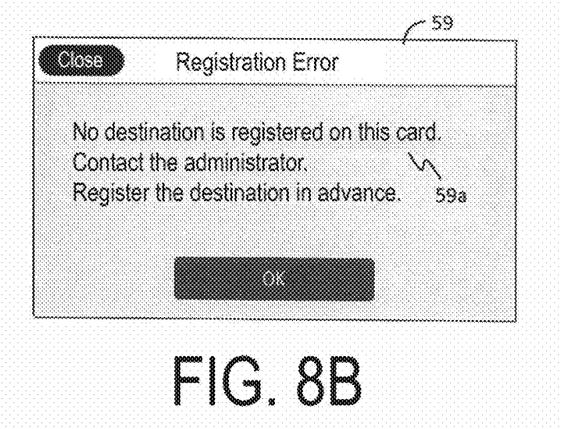
FIG. 8B is a diagram illustrating a UI screen for displaying a registration error.

FIG. 8B illustrates an example of a UI screen 59 indicating the registration error of the destination. On the UI screen 59, a message 59a is displayed to notify the user that the destination corresponding to the user ID of the read IC card is not registered and that the destination should be registered by contacting the administrator.

It is assumed that the start button 52d is pressed at the timing of any of steps S110, S117, and S124, or at the timing when the user finishes selecting the destination and the scanning method through any of steps S109, S116, and S123 under a situation where the user authentication is successful. In this case, the setting unit 25 sets the scan to folder function of the image scanner 20 according to the destination and the scanning method selected on the UI screen. Then, the setting unit 25 causes the scanning unit 27 and the communication unit 30 to execute the scan to folder function according to this setting.

In step S126, the display control unit 23 determines whether a UI screen that the display control unit 23 causes the display unit 26 to display at present is an "administrator screen". The administrator screen is a UI screen that can be operated only by the administrator. The administrator screen is also referred to as a "fourth UI screen". When the UI screen that the display control unit 23 causes the display unit 26 to display at present is the administrator screen, the display control unit 23 determines "Yes" and the processing proceeds to step S127. When the UI screen is not the administrator screen, the display control unit 23 determines "No" and the processing proceeds to step S131.

Figure 8C:
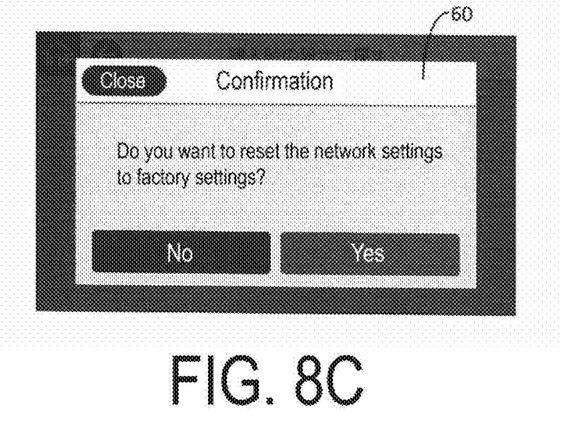
FIG. 8C is a diagram illustrating a UI screen as an administrator screen.

FIG. 8C illustrates a UI screen 60 which is an example of the administrator screen. The UI screen 60 is a UI screen for selecting whether to return network settings in the communication unit 30 to factory settings of the image scanner 20, that is, whether to reset the network settings. In addition, a UI screen for editing registration information of the user, a UI screen for updating firmware, and the like correspond to the administrator screen.

In step S127, the authentication unit 24 authenticates the user in the same manner as in steps S102, S106, S113, and S120. When the authentication of the user is successful, the processing proceeds to step S128 based on the determination of "Yes" in step S127 by the authentication unit 24. When the authentication of the user fails, the processing proceeds to step S104 based on the determination of "No" in step S127.

In step S128, the display control unit 23 acquires the administrator information registered corresponding to the input user ID from the DB 32, and determines the presence or absence of administrative authority. In other words, when the administrator information corresponding to the input user ID indicates the "administrator", the processing proceeds to step S129 based on the determination of "Yes" by the display control unit 23. When the administrator information indicates the "normal user", the processing proceeds to step S130 based on the determination of "No". Additionally, when the administrator information corresponding to the input user ID is not registered in the DB 32 in the first place, the display control unit 23 also determines "No" in step S128.

In step S129, the display control unit 23 causes the display unit 26 to display the authentication screen, and then the flowcharts of FIGS. 3 and 4 are terminated. Before reaching step S129, authentication based on the user ID has been completed in step S127. Thus, the authentication screen displayed in step S129 can be said to be a UI screen for performing a second step of authentication for the user. In other words, the display control unit 23 eliminates unauthorized operation by performing two-step authentication for the administrator screen.

Figure 9A:
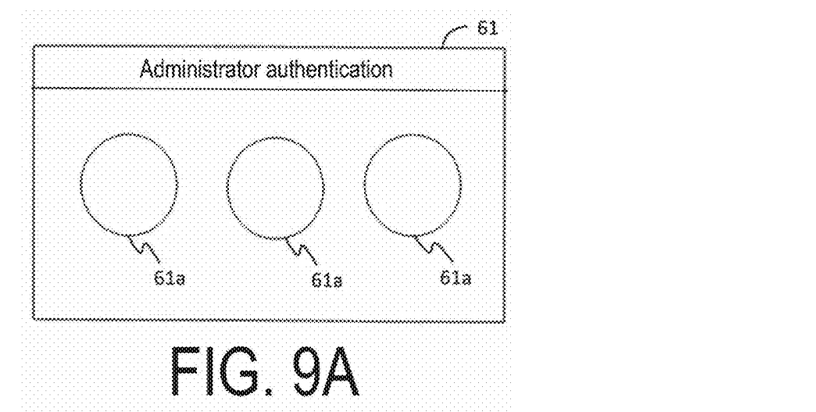
FIG. 9A is a diagram illustrating a UI screen as an authentication screen.

FIG. 9A illustrates a UI screen 61 as the authentication screen displayed in step S129. As described above, the display unit 26 is the touch panel display. The UI screen 61 has a plurality of circles 61a representing touch positions. The administrator knows in advance predetermined operation for successful authentication on the UI screen 61. The predetermined operation referred to here is a combination of touches determined by the position and number of touches, the touch time length, the order of touches, and the like for the plurality of circles 61a.

The authentication unit 24 determines, for example, that the authentication is successful when the predetermined operation on the UI screen 61 is performed within a predetermined time. Based on the determination of the successful authentication, the display control unit 23 may stop the display of the UI screen 61 and allow the operation to the administrator screen. The authentication screen displayed in step S129 is not limited to the screen of FIG. 9A, but may be, for example, a UI screen that displays a software keyboard to receive the input of an authentication password dedicated to the administrator. Alternatively, when the display unit 26 is a display on which touch input is not possible, the authentication screen displayed in step S129 may be a screen for authenticating the user when predetermined operation for physical buttons outside the display unit 26 is received.

In step S130, the display control unit 23 causes the display unit 26 to display a UI screen indicating a registration error of the administrative authority, and then the flowcharts of FIGS. 3 and 4 are terminated.

Figure 9B:
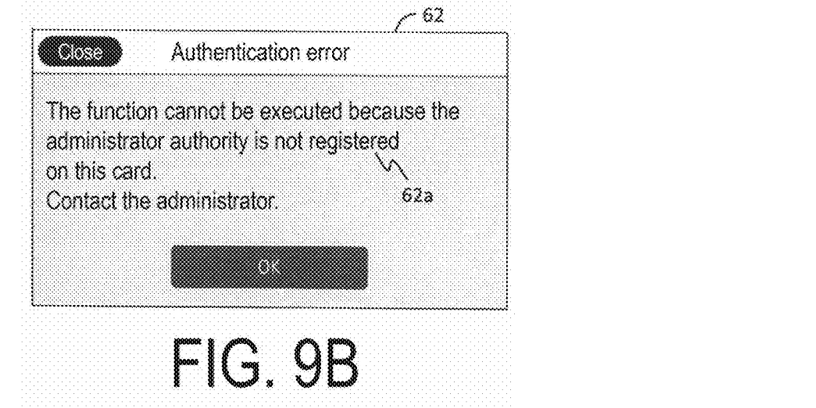
FIG. 9B is a diagram illustrating a UI screen for displaying an administrator authority register error.

FIG. 9B illustrates an example of a UI screen 62 indicating the registration error of the administrative authority. On the UI screen 62, a message 62a is displayed to notify the user that the administrative authority is not registered corresponding to the user ID of the read IC card and that the administrator should be contacted.

When the IC card is read by the card communication unit 29, that is, when the display control unit 23 determines "Yes" in step S100, in a case that the display unit 26 displays a UI screen on which the information registered in the DB 32 corresponding to the user ID is not used, the processing proceeds to step S131. The "UI screen on which the information registered in the DB 32 corresponding to the user ID is not used" is referred to as a "fifth UI screen". In the examples of FIGS. 3 and 4, the UI screen determined to be "No" in all of the steps S101, S105, S112, S119, and S126 is the fifth UI screen.

Although not illustrated in FIGS. 3 and 4 due to space limitation, the display control unit 23 displays setting information corresponding to the input user ID and the function on the UI screen as in the case of displaying the scan to folder screen, even when the timing of determining "Yes" in step S100 is when the display unit 26 displays a UI screen for selecting the setting information for the scan to mail function (scan to mail screen). Similarly, the display control unit 23 can display the setting information corresponding to the input user ID and the function on the UI screen, even when the timing of determining "Yes" in step S100 is when the display unit 26 displays either UI screen for selecting the setting information for the copy function or the facsimile transmission function. That is, neither the scan to mail screen nor the respective UI screens for selecting the setting information for the copy function and the facsimile transmission function corresponds to the fifth UI screen.

In step S131, the display control unit 23 causes the display unit 26 to display that the UI screen on which the information registered in the DB 32 corresponding to the user ID can be used is informed, and then the flowcharts of FIGS. 3 and 4 are terminated. The "UI screen on which the information registered in the DB 32 corresponding to the user ID can be used" is also referred to as an ID available screen. The first to fourth UI screens described heretofore are all ID available screens. The welcome screen, the scan to mail screen, and the UI screen for selecting setting information for the copy function and the UI screen for selecting setting information for the facsimile transmission function are also a kind of the ID available screen.

Figure 9C:
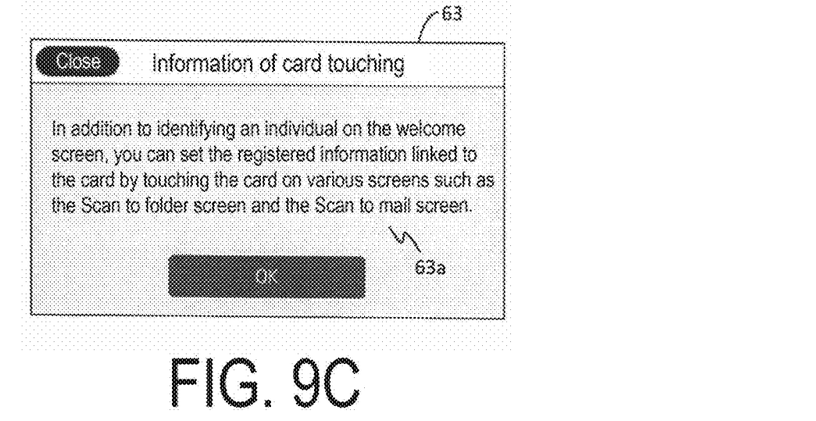
FIG. 9C is a diagram illustrating a UI screen as an information display.

FIG. 9C illustrates an example of a UI screen 63 as a display to inform the ID available screen. On the UI screen 63, a message 63a indicating that information registered corresponding to the user ID can be used by reading the IC card while the scan to folder screen or the scan to mail screen is displayed.

4. Summary

As described above, according to the present embodiment, the image scanner 20 includes the display unit 26 configured to display a UI screen that receives operation, the authentication unit 24 configured to authenticate a user based on identification information input through reading of an identification medium having the identification information of the user, the display control unit 23 configured to control display by the display unit 26, the setting unit 25 configured to set functions of the image scanner 20 according to setting information selected on the UI screen in a state in which the user is successfully authenticated by the authentication unit 24, and the storage unit 31 configured to store the DB 32 in which the identification information, at least one of the functions, and the setting information are registered in association with each other. Then, the display control unit 23 acquires the setting information from the DB 32 corresponding to the identification information input through reading of the identification medium and the functions to which the UI screen displayed by the display unit 26 when the identification medium is read corresponds, and causes the display unit 26 to display the acquired setting information.

According to the above configuration, when the display control unit 23 inputs the identification information (user ID) by the user causing the image scanner 20 to read the identification medium such as an IC card, the display control unit 23 causes the display unit 26 to display the setting information corresponding to the user ID and the function to which the UI screen displayed by the display unit 26 at that time corresponds. This allows the user to easily select the setting information suitable for the function of the image scanner 20 to be set on the current UI screen and the user. That is, by expanding the use of the identification information for purposes other than individual authentication, the convenience of the user can be enhanced.

Further, according to the present embodiment, the image scanner 20 has the scan transmission function of transmitting image data generated by scanning an original document by a selected scanning method to a selected destination. In the DB 32, the identification information, the scan transmission function, the scanning method and the destination as the setting information are registered in association with each other. Then, in the case in which the display unit 26 displays the first UI screen, which is the UI screen corresponding to the scan transmission function when the identification medium is read, the display control unit 23 acquires the scanning method and the destination corresponding to the identification information input through reading of the identification medium and the scan transmission function from the DB 32, and causes the display unit 26 to display the acquired scanning method and the acquired destination.

According to the above configuration, the user can easily select the scanning method and the destination to be set on the first UI screen suitable for the scan transmission function and the user.

Further, according to the present embodiment, in the case in which the display unit 26 displays the second UI screen with the destination selected, which is the screen for selecting the scanning method and is a kind of the first UI screen when the identification medium is read, the display control unit 23 acquires the scanning method corresponding to the identification information input through reading of the identification medium and the scan transmission function from the DB 32, and causes the display unit 26 to display the acquired scanning method.

According to the above configuration, the user can easily select the suitable scanning method for the user in a state in which the second UI screen on which the destination for the scan transmission function is selected is displayed.

Further, according to the present embodiment, in the case in which the display unit 26 displays the third UI screen with the scanning method selected, which is the screen for selecting the destination and is a kind of the first UI screen when the identification medium is read, the display control unit 23 acquires the destination corresponding to the identification information input through reading of the identification medium and the scan transmission function from the DB 32, and causes the display unit 26 to display the acquired destination.

According to the above configuration, the user can easily select a suitable destination for the user in a state in which the third UI screen in which the scanning method for the scan transmission function is selected is displayed.

In addition, according to the present embodiment, in the DB 32, the identification information and the administrator information indicating presence or absence of the administrative authority of the image scanner 20 are registered in association with each other. In the case in which the display unit 26 displays the fourth UI screen, which is the UI screen that is configured to be operated only by the user having the administrative authority when the identification medium is read, the display control unit 23 acquires the administrator information corresponding to the identification information input through reading of the identification medium from the DB 32, and when the acquired administrator information indicates that the user has the administrative authority, the display control unit 23 causes the display unit 26 to display the authentication screen for further authenticating the user in the state in which the user is successfully authenticated based on the identification information.

According to the above configuration, it is possible to enhance security by performing two-step authentication for the user who intends to operate the fourth UI screen.

In addition, according to the present embodiment, the display unit 26 is the touch panel display, and the authentication unit 24 may authenticate the user when the authentication unit 24 receives the predetermined touch combination via the authentication screen.

According to the above configuration, the authentication unit 24 can authenticate only the user who knows the predetermined touch combination.

Further, according to the present embodiment, in the case in which the display unit 26 displays the fifth UI screen, which is the UI screen on which the information registered in the DB 32 corresponding to the identification information is not used when the identification medium is read, the display control unit 23 causes the display unit 26 to display a message indicating the UI screen on which the information registered in the DB 32 corresponding to the identification information is used.

According to the above configuration, the display control unit 23 informs the user who views the fifth UI screen that there is the UI screen such as the first UI screen on which the information registered in the DB 32 corresponding to the identification information can be used. Accordingly, the convenience of the user can be further improved.

The present embodiment discloses not only the image scanner 20, but also a system, a method, and a program.

According to the image scanning system 10 including the image scanner 20 and the storage apparatus (server 40) that are communicably connected with each other, the image scanner 20 includes the display unit 26 configured to display a UI screen that receives operation, the authentication unit 24 configured to authenticate a user based on identification information input through reading of an identification medium having the identification information of the user, the display control unit 23 configured to control display by the display unit 26, and the setting unit 25 configured to set functions of the image scanner 20 according to setting information selected on the UI screen in a state in which the user is successfully authenticated by the authentication unit 24. The storage apparatus stores the DB 32 in which the identification information, at least one of the functions, and the setting information are registered in association with each other. Then, the display control unit 23 acquires the setting information from the DB 32 corresponding to the identification information input through reading of the identification medium and the functions to which the UI screen displayed by the display unit 26 when the identification medium is read corresponds, and causes the display unit 26 to display the acquired setting information.

Further, the control method of the image scanner 20 executed by the processor 21 according to the program 22 includes a display control step for causing the display unit 26 to display a UI screen that receives operation, an authentication step for authenticating a user based on identification information input through reading of an identification medium having the identification information of the user, and a setting step for setting one of functions of the image scanner 20 according to setting information selected on the UI screen in a state in which the user is successfully authenticated in the authentication step. Then, in the display control step, the DB 32 in which the identification information, at least one of the functions, and the setting information are registered in association with each other is referred, the setting information corresponding to the identification information input through reading of the identification medium and the functions to which the UI screen displayed by the display unit 26 when the identification medium is read corresponds is acquired, and the acquired setting information is displayed by the display unit 26.

Needless to say, the execution order of the determinations in steps S101, S105, S112, S119, and S126 of FIGS. 3 and 4 may not be as illustrated in the figures. When the processor 21 determines "Yes" in step S100, for example, the processor 21 may not execute the determination in step S101 first. Further, for example, the processor 21 may perform a determination in step S105 after determining "No" in step S126, or may perform a determination in step S112 after determining "No" in step S119.

What is claimed is:

1. An image scanner comprising:
  a display unit configured to display a user interface screen configured to receive operation;
  an authentication unit configured to authenticate a user based on identification information input through reading of an identification medium having the identification information of the user;
  a display control unit configured to control display by the display unit;
  a setting unit configured to set functions of the image scanner according to setting information selected on the user interface screen in a state in which the user is successfully authenticated by the authentication unit; and
  a storage unit configured to store a database in which the identification information, at least one of the functions, and the setting information are registered in association with each other, wherein
  the display control unit acquires the setting information from the database corresponding to the identification information input through reading of the identification medium and the functions to which the user interface screen displayed by the display unit when the identification medium is read corresponds, and causes the display unit to display the acquired setting information,
  the image scanner has a scan transmission function of transmitting image data generated by scanning an original document by a selected scanning method to a selected destination,
  in the database, the identification information, the scan transmission function, and the scanning method and the destination as the setting information are registered in association with each other, and
  in a case in which the display unit displays a first UI screen, which is the user interface screen corresponding to the scan transmission function when the identification medium is read, the display control unit acquires the scanning method and the destination corresponding to the identification information input through reading of the identification medium and the scan transmission function from the database, and causes the display unit to display the acquired scanning method and the acquired destination.

2. The image scanner according to claim 1, wherein
in a case in which the display unit displays a second UI screen with the destination selected, which is a screen for selecting the scanning method and is a kind of the first UI screen when the identification medium is read, the display control unit acquires the scanning method corresponding to the identification information input through reading of the identification medium and the scan transmission function from the database, and causes the display unit to display the acquired scanning method.

3. The image scanner according to claim 1, wherein
in a case in which the display unit displays a third UI screen with the scanning method selected, which is a screen for selecting the destination and is a kind of the first UI screen when the identification medium is read, the display control unit acquires the destination corresponding to the identification information input through reading of the identification medium and the scan transmission function from the database, and causes the display unit to display the acquired destination.

4. The image scanner according to claim 1, wherein
in the database, the identification information and administrator information indicating presence or absence of administrative authority of the image scanner are registered in association with each other, and
in a case in which the display unit displays a fourth UI screen, which is the user interface screen that is configured to be operated only by a user having the administrative authority when the identification medium is read, the display control unit acquires the administrator information corresponding to the identification information input through reading of the identification medium from the database, and when the acquired administrator information indicates that the user has the administrative authority, the display control unit causes the display unit to display an authentication screen for further authenticating the user in a state in which the user is successfully authenticated based on the identification information.

5. The image scanner according to claim 4, wherein
the display unit is a touch panel display, and
the authentication unit authenticates the user when the authentication unit receives a predetermined touch combination via the authentication screen.

6. The image scanner according to claim 1, wherein
in a case in which the display unit displays a fifth UI screen, which is the user interface screen on which information registered in the database corresponding to the identification information is not used when the identification medium is read, the display control unit causes the display unit to display a message indicating a user interface screen on which the information registered in the database corresponding to the identification information is usable.

7. A control method of an image scanner comprising:
a display control step for causing a display unit to display a user interface screen configured to receive operation;
an authentication step for authenticating a user based on identification information input through reading of an identification medium having the identification information of the user; and
a setting step for setting one of functions of the image scanner according to setting information selected on the user interface screen in a state in which the user is successfully authenticated in the authentication step, wherein
the display control step includes referring to a database in which the identification information, at least one of the functions, and the setting information are registered in association with each other to acquire the setting information corresponding to the identification information input through reading of the identification medium and the functions to which the user interface screen displayed by the display unit when the identification medium is read corresponds, and causing the display unit to display the acquired setting information,
the image scanner has a scan transmission function of transmitting image data generated by scanning an original document by a selected scanning method to a selected destination,
in the database, the identification information, the scan transmission function, and the scanning method and the destination as the setting information are registered in association with each other,
in a case in which the display unit displays a first UI screen, which is the user interface screen corresponding to the scan transmission function when the identification medium is read, the display control unit acquires the scanning method and the destination corresponding to the identification information input through reading of the identification medium and the scan transmission function from the database, and causes the display unit to display the acquired scanning method and the acquired destination.

8. A control method of an image scanner comprising:
a display control step for causing a display unit to display a user interface screen configured to receive operation;
an authentication step for authenticating a user based on identification information input through reading of an identification medium having the identification information of the user; and
a setting step for setting one of functions of the image scanner according to setting information selected on the user interface screen in a state in which the user is successfully authenticated in the authentication step, wherein
the display control step includes referring to a database in which the identification information, at least one of the functions, and the setting information are registered in association with each other to acquire the setting information corresponding to the identification information input through reading of the identification medium and the functions to which the user interface screen displayed by the display unit when the identification medium is read corresponds, and causing the display unit to display the acquired setting information,
in the database, the identification information and administrator information indicating presence or absence of administrative authority of the image scanner are registered in association with each other, and
in a case in which the display unit displays a fourth UI screen, which is the user interface screen that is configured to be operated only by a user having the administrative authority when the identification medium is read, the display control unit acquires the administrator information corresponding to the identification information input through reading of the identification medium from the database, and when the acquired administrator information indicates that the user has the administrative authority, the display control unit causes the display unit to display an authentication screen for further authenticating the user in a state in which the user is successfully authenticated based on the identification information.

* * * * *